3,368,911
COLLAGEN-CARBONIC ACID SURGICAL SPONGE

Eloise Kuntz, Okemos, Mich., and Elie S. Nuwayser, Basking Ridge, N.J., assignors to Ethicon, Inc., a corporation of New Jersey
No Drawing. Filed Mar. 25, 1965, Ser. No. 442,805
5 Claims. (Cl. 106—155)

ABSTRACT OF THE DISCLOSURE

Collagen fibrils are swollen and dispersed in an aqueous solution of carbonic acid. Lyophilization of the dispersion produces porous collagen sponges of high purity.

---

The present invention relates to aqueous carbonic acid swollen collagen fibrils and to liquid permeable water insoluble collagen sponges manufactured therefrom. The collagen sponges of the present invention are useful in surgical procedures.

The use of sponges to control bleeding has long been a conventional practice among surgeons. The porous structure of the sponge quickly absorbs the blood and is ideally suited to hold a therapeutic agent or a coagulant such as thrombin. Moreover, the compressability of the sponge structure permits the application of uniform pressure which of itself reduces bleeding.

It is sometimes desirable for the surgeon to replace removed tissue by filling the body cavity with a sponge-like material. Collagen sponges are well adapted to this use as they are non-antigenic and absorbable.

Spongelike collagen masses have been previously prepared by freezing a mass of acid-swollen collagen fibrils and subliming the water under high vacuum while maintaining the temperature below the freezing point. Such a lyophilized sponge contains many open channels throughout the mass of residual collagen fibrils. Sponges obtained in this manner, however, retain the acid used to swell the collagen and, therefore, will revert to a gel-like state when immersed in water. While it is possible to convert the sponge to a water insoluble state by neutralizing the acid component, such chemical action distorts the rigid sponge structure.

One process for removing the residual acid from sponges manufactured from acid-swollen collagen fibrils is described in U.S. Patent No. 3,157,524. The examples of that patent describe the use of cold ammoniacal isopropyl alcohol to neutralize the acid present in lyophilized collagen sponges. Sponges prepared by the isopropyl alcohol process are of excellent quality, but the procedure is time-consuming and expensive because of the large volume of isopropyl alcohol required.

It has now been discovered that collagen fibrils may be swollen and dispersed in an aqueous solution of carbonic acid. Although the swelling of collagen in strongly acid or strongly basic media is a well known phenomenon, the swelling of collagen by such a weak acid as carbonic acid was previously unknown and completely unexpected. By lyophilizing such a carbonic acid dispersion of collagen under the proper conditions, one may obtain a porous and resilient collagen sponge that is liquid permeable, water insoluble, odorless and readily absorbed in the animal body. While the present invention is not to be limited by any theoretical considerations, one might speculate that the carbonic acid is decomposed under the conditions employed during the lyophilization step and removed from the sponge structure as carbon dioxide gas.

The collagen that is employed as a starting material in preparing the sponges of the present invention may be obtained from bovine tendon. The deep flexor tendon and the branches of the deep flexor tendon are preferred. The coarseness and resilience of the sponge may be modified by using combinations of the above identified tendon sections. Reconstituted untanned collagen tape, prepared as described in U.S. Patents No. 3,114,591 and No. 3,114,593, is also a suitable material to use in the manufacture of sponges either alone or in combination with bovine tendon.

The swelling solution of carbonic acid may be prepared by bubbling carbon dioxide gas through distilled water at the desired temperature. The pH of saturated solutions of carbon dioxide at various temperatures is summarized in Table 1.

TABLE 1

| Temperature, °C. | Concentration, g./100 ml. | $Ka \times 10^{-7}$ | Molarity | pH |
|---|---|---|---|---|
| 0 | 0.3346 | 2.64 | 0.076 | 3.85 |
| 5 | 0.2774 | 3.04 | 0.063 | 3.86 |
| 10 | 0.2318 | 3.44 | 0.053 | 3.87 |
| 15 | 0.1970 | 3.81 | 0.045 | 3.88 |
| 20 | 0.1688 | 4.16 | 0.038 | 3.90 |
| 25 | 0.1449 | 4.45 | 0.032 | 3.92 |
| 30 | 0.1257 | 4.71 | 0.028 | 3.94 |
| 35 | 0.1105 | 4.90 | 0.026 | 3.95 |

An increase in the concentration of carbonic acid in solution may be achieved by using pressures greater than atmospheric at the desired temperature. Such conditions can be adjusted to secure the swelling of the fibrils and the formation of a collagen dispersion in the general region of 0–35° C. Lower temperatures are preferred to minimize denaturization of the collagen. The optimum temperature range for swelling collagen appears to be 0–4° C. at atmospheric pressure. The swelling of the collagen may be hastened by continuous or intermittent agitation of the acidic suspension.

The carbonic acid swollen collagen fibrils may be lyophilized, and the characteristics of the collagen sponge so obtained may be controlled by tanning. While many of the conventional tanning procedures such as those described in U.S. Patents No. 3,152,976, No. 3,166,073 and No. 3,166,074 are suitable, the use of formaldehyde vapor provides exceptionally good control of the physiological absorption and physical properties of the sponge. The concentration of formaldehyde together with the time and temperature of tanning are important factors in formaldehyde tanning. If the collagen sponges are left in contact with formaldehyde vapor for more than 24 hours the strength of the sponge and its ability to absorb liquids will be increased but the product is more slowly absorbed. This is particularly true if the temperature during the formaldehyde tanning step is appreciably above room temperature (greater than 20° C.). The sponges of the present invention may also be tanned by heating the sponge at temperatures between 100°–140° C. for short periods ranging from 15–120 minutes.

The swelling of collagen in aqueous carbonic acid solutions to form a collagen dispersion and the preparation of collagen sponges from such a dispersion will be illustrated by the following examples in which all quantities are expressed in parts by weight unless otherwise indicated.

Example I

Three hundred parts of reconstituted collagen tape prepared as described in Example X of U.S. Patent No. 3,114,593 are placed in a perforated metal basket which is placed in a stainless steel kettle. To this is added 151,412 parts of an aqueous solution containing 0.1% sodium chloride, and the tape is dispersed by stirring. The tape is allowed to soak in this solution for a period of 3–4 hours. After this, the liquid is drained and fresh saline solution is added. This process is repeated three times. The tape is then washed three times with 40,000 parts of distilled water for a period of 3-4 hours each washing.

An aqueous saturated solution of carbonic acid at 0-4° C. is then added to the washed and drained tape unitil the final volume is 50,000 parts by volume. The above carbonic acid solution is prepared by adding dry ice to distilled water and stirring until the temperature drops below 4° C.

The tape is then uniformly dispersed by gentle stirring for a few minutes. The container is lightly covered to keep the atmosphere above the liquid saturated with carbon dioxide gas and prevent its excessive loss. The collagen is allowed to swell overnight under these conditions.

After swelling, the resulting mass is thoroughly stirred for half an hour, and then homogenized by repeated passage through a ⅛ inch orifice. The homogenized mass is poured into 18" x 20" x 2½" stainless steel forms, each containing 900 parts by volume. Each tray is levelled manually. The thickness of the final sponge is related to the thickness of the layer of collagen dispersion in the tray. The trays are then placed in a freezer or in a cooled lyophilizer and the temperature of the collagen dispersion in the trays is reduced to between minus 8° C. and minus 15° C. The trays and their contents are maintained at this temperature for at least three hours. After this, the frozen collagen dispersion is lyophilized by reducing the pressure within the lyophilizer to approximately 100 microns while maintaining the temperature at minus 15° C. After the lyophilization has proceeded for four hours, the temperature of the collagen is raised to between minus 5° C. and 0° C. over a period of one hour. Lyophilization is continued for another nine hours at this temperature. After nine hours the temperature is raised to 40° C. over a period of three hours and this temperature (40° C.) is maintained until the sponge is completely dried. The final drying at 40° C. requires from four to ten hours. The resulting dried sponge is ⅛" thick.

The rate of physiological absorption of the sponges is then modified by tanning. This is accomplished by placing the sponges overnight at ambient temperature in a closed chamber containing a tray filled with a 1% aqueous formaldehyde solution. The volume of tanning solution should be sufficient to saturate the air in the chamber with its vapors.

The tanning sponge so obtained does not have a slippery feeling when wet and produces no odors upon prolonged storage. Furthermore, the sponge does not contain residual swelling acids. The sponge possesses good tensile properties in the wet and dry states.

The sponge prepared by the procedure described in this example is substantially free of inorganic salts since it is not necessary to neutralize the swelling acid with a base. The ash content of the sponge is 0.012%. Moreover, the sponge is not strongly acid as may be demonstrated by immersing 2 parts by weight of the sponge in 1000 parts by weight of distilled water and stirring for one hour. The pH of the distilled water at the end of this time is 4.8.

*Example II*

Bovine tendon, (the deep flexor tendon) is sliced into thin sections and 130 parts of these slices are washed in distilled water. The washed slices are placed in 1,000 parts by volume of 10% sodium chloride and stored in a cold room overnight. The following day the salt solution is decanted away from the slices and replaced with an equal volume of fresh 10% sodium chloride solution. After 24 hours the tendon slices are washed with six changes of distilled water and treated with 1,000 parts by volume of a 2% malt diastase solution at 37° C. overnight. The pH of the malt diastase solution is 8.2.

The malt diastase treated tendon slices are washed with four changes of distilled water and treated for two hours with 1,000 parts by volume of a 0.4% aqueous solution of the disodium salt of ethylene diamine tetraacetic acid. The tendon slices are then washed again with six changes of distilled water. Two hundred and thirty parts by weight of the wet collagen slices are recovered after this final washing step.

Dry Ice is added to 3,000 parts by volume of water with stirring until the water is saturated with carbon dioxide. To this carbonic acid solution is added 115 parts of the purified tendon slices prepared as described above and the mixture is placed in a cold room overnight. The swollen collagen mass so obtained is diluted with saturated aqueous carbonic acid to a total volume of 5,000 parts by volume and the mixture is homogenized in a Waring Blendor for ten seconds. To the dispersion of swollen collagen fibrils in aqueous carbonic acid so obtained is added 0.6 part of riboflavin in 200 parts by volume of water with stirring.

A layer of this collagen dispersion is irradiated for six hours with sunlight (200 foot candles), frozen quickly and lyophilized. The sponge so obtained is more dense than the sponge of Example I. It has been observed that the concentration of collagen in the dispersion affects the density of the sponge prepared therefrom; the greater the concentration of collagen in the aqueous dispersion, the greater the density of the sponge. Dilute collagen dispersions yield sponges of low density.

*Example III*

One hundred and twenty parts of reconstituted collagen tape are placed in a perforated metal basket which is placed in a stainless steel kettle. To this are added 2,000 parts of 0.85% sodium chloride solution and the tape is dispersed by stirring. The tape is allowed to soak for a period of one hour. After this the liquid is drained and fresh saline solution is added. This process is repeated one more time. The tape is then washed three times in 2,000 parts of an aqueous solution of carbonic acid at 0-4° C. for a period of one minute each washing. The above carbonic acid solution is prepared by adding Dry Ice to distilled water and stirring until the temperature reaches below 4° C.

Two thousand parts by weight of an aqueous solution of carbonic acid at 0-4° C. are then added to the washed and drained tape. The tape is uniformly dispersed by gentle stirring for a few minutes. The container is lightly covered to keep the atmosphere above the liquid saturated with carbonic acid gas and prevent its excessive loss. The collagen is allowed to swell for one hour under these conditions.

After swelling, the resulting mass is homogenized in a Waring Blendor for 3 to 5 minutes. The homogenized mass has a viscosity of 970 centipoises at 30° C. as measured by the cone-plate Ferranti-Shirley viscometer. It may be stored at 4° C. in the refrigerator.

For the preparation of high density sponges, the mass is frozen as such and then lyophilized. Alternatively, it may be diluted with water to produce dispersions of low solids content useful for fabricating low density sponges. These diluted dispersions are more homogeneous and stable than those produced in Example I.

While the invention has been described in detail according to the preferred manner of carrying out the process and yielding the products, it will be obvious to those skilled in the art, after understanding the invention, that changes and modifications may be made therein without departing from the spirit or scope of the invention and it is intended in the appended claims to cover such changes and modifications.

What is claimed is:

1. A fluid mass of substantially pure collagen fibrils swollen with carbonic acid.

2. A dispersion of swollen collagen fibrils in an aqueous solution of carbonic acid, 3. In a method of manufacturing collagen sponges suitable for surgery, the steps of:
- swelling substantially pure collagen fibrils in aqueous carbonic acid at a temperature between 0° C. and 35° C.;
- homogenizing the swollen collagen to form a uniform collagen mass;
- shaping the collagen mass into a desired form; and,
- lyophilizing the shaped collagen mass to form an odorless, water permeable, water insoluble collagen sponge.

4. The method of claim 3 wherein the collagen sponge is tanned by contacting the sponge with formaldehyde vapor at a temperature in the range of 20° to 140° C.

5. The method of claim 3 wherein the collagen sponge is sterilized by irradiation with gamma rays, the radiation dosage being about 2.5 megarads.

References Cited

UNITED STATES PATENTS

| | | | |
|---|---|---|---|
| 2,147,542 | 2/1939 | Ochs | 195—6 |
| 2,610,625 | 9/1952 | Sifferd et al. | 106—122 |

ALEXANDER H. BRODMERKEL, *Primary Examiner.*

T. MORRIS, *Assistant Examiner.*